United States Patent
Haswell

(10) Patent No.: US 11,886,286 B2
(45) Date of Patent: *Jan. 30, 2024

(54) ENHANCED CHECKSUM SYSTEM

(71) Applicant: SAMSUNG ELECTRONICS CO., LTD., Yeongtong-gu (KR)

(72) Inventor: Jonathan M. Haswell, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

This patent is subject to a terminal disclaimer.

(21) Appl. No.: 17/480,661

(22) Filed: Sep. 21, 2021

(65) Prior Publication Data

US 2022/0004454 A1     Jan. 6, 2022

Related U.S. Application Data

(63) Continuation of application No. 13/485,810, filed on May 31, 2012, now Pat. No. 11,132,251.

(51) Int. Cl.
*H03M 13/09* (2006.01)
*G06F 11/10* (2006.01)

(52) U.S. Cl.
CPC ....... *G06F 11/1004* (2013.01); *H03M 13/096* (2013.01)

(58) Field of Classification Search
CPC .................. G06F 11/1004; H03M 13/096
USPC ....................................................... 714/807
See application file for complete search history.

(56) References Cited

U.S. PATENT DOCUMENTS

| | | | |
|---|---|---|---|
| 4,500,958 A | 2/1985 | Manton | |
| 5,499,380 A | 3/1996 | Iwata | |
| 5,828,676 A | 10/1998 | Hurlbut | |
| 6,334,204 B1 | 12/2001 | Suh | |
| 6,616,254 B1 | 9/2003 | Raphaeli | |
| 6,964,008 B1 | 11/2005 | Van Meter, III | |
| 7,570,447 B2 * | 8/2009 | Koga | G06F 11/1004 714/763 |
| 7,624,335 B1 * | 11/2009 | Maheshwari | G06F 11/1004 714/15 |
| 7,987,405 B2 | 7/2011 | Turner | |
| 8,132,088 B2 * | 3/2012 | Evans | G11B 20/1207 714/758 |
| 9,372,870 B1 | 6/2016 | Levy | |
| 2004/0143655 A1 | 7/2004 | Narad et al. | |
| 2004/0172582 A1 | 9/2004 | Gemelli | |
| 2005/0204263 A1 | 9/2005 | Ricci | |
| 2006/0098320 A1 * | 5/2006 | Koga | G06F 11/1004 360/53 |
| 2007/0053513 A1 | 3/2007 | Hoffberg | |
| 2009/0046386 A1 | 2/2009 | Evans | |
| 2010/0070839 A1 * | 3/2010 | Shigihara | H03M 13/091 714/E11.032 |
| 2010/0192050 A1 | 7/2010 | Burbridge | |

(Continued)

*Primary Examiner* — Albert Decady
*Assistant Examiner* — Enam Ahmed
(74) *Attorney, Agent, or Firm* — Sughrue Mion, PLLC

(57) ABSTRACT

Generating data checksum for a data object including multiple data units comprises, for each data unit, obtaining a corresponding address of the data unit, and rotating the data unit based on said corresponding address of the data unit to generate a rotated data unit. A checksum value for the data object is determined based on said rotated data units.

21 Claims, 5 Drawing Sheets

(56) References Cited

U.S. PATENT DOCUMENTS

| | | | |
|---|---|---|---|
| 2010/0306634 A1* | 12/2010 | Lincoln | G11B 20/1833 |
| | | | 714/E11.032 |
| 2011/0191652 A1 | 8/2011 | Dave | |
| 2011/0202813 A1* | 8/2011 | Resnick | G06F 11/1004 |
| | | | 714/763 |
| 2011/0231536 A1 | 9/2011 | Tanaka | |
| 2012/0011424 A1 | 1/2012 | Schuette | |
| 2012/0036414 A1* | 2/2012 | Kaynak | H03M 13/13 |
| | | | 714/752 |
| 2013/0163753 A1 | 6/2013 | MacMillan | |
| 2013/0262421 A1 | 10/2013 | Ferguson et al. | |
| 2014/0331111 A1* | 11/2014 | Kroeger | H04L 1/0072 |
| | | | 714/807 |
| 2015/0160998 A1* | 6/2015 | Anvin | G06F 12/0817 |
| | | | 714/807 |
| 2016/0124802 A1* | 5/2016 | Gabor | G06F 11/10 |
| | | | 714/807 |

* cited by examiner

ENHANCED CHECKSUM SYSTEM

CROSS-REFERENCE TO RELATED APPLICATION

This application is a Continuation Application of U.S. patent application Ser. No. 13/485,810, filed on May 31, 2012, in the United States Patent and Trademark Office, the disclosures of which are incorporated herein in their entireties by reference.

FIELD OF THE INVENTION

The present invention relates to the detection of corruption of data using checksum algorithms.

DESCRIPTION OF RELATED ART

Conventional computing systems calculate forms of checksums to be able to validate if data has been modified or corrupted during storage or transmission. Checksums typically being used in systems where the computational or memory overheads of more complex Cyclic Redundancy Check (CRC) or Error Correction Code (ECC) algorithms are unaffordable. A simple checksum algorithm divides the data into data units such as bytes with a fixed number of bits, and then computes the Exclusive OR (XOR) of all those bytes.

The checksum is included with the data for storage or transmission. A typical scenario would be to apply an algorithm to generate a 'check value' to a block of data before it is stored. Then, when the block data is retrieved from storage, the same algorithm is applied and the 'check value' is recalculated and compared to the original check value. If they match there is reasonable assurance the data was not modified or corrupted while being stored.

BRIEF SUMMARY

According to an embodiment of the invention, generating data redundancy for a data object including multiple data units comprises, for each data unit, obtaining the address or offset of the data unit from the start of the data object, and rotating the data unit based on said corresponding address of the data unit to generate a rotated data unit. A checksum value for the data object is determined based on said rotated data units.

These and other features, aspects and advantages of the present invention will become understood with reference to the following description, appended claims and accompanying figures.

DETAILED DESCRIPTION OF THE INVENTION

Embodiments of the invention relate to checksum calculation. According to an embodiment of the invention, a checksum system implements a checksum process that processes the data to be protected and includes addressing information for each byte being processed. As such, a checksum generated by the checksum system protects not just against data changes but also data reordering.

According to an embodiment of the invention, generating data redundancy for a data object including multiple data units comprises, for each data unit, obtaining a corresponding address of the data unit, and rotating the data unit based on said corresponding address of the data unit to generate a rotated data unit. A checksum value for the data object is determined based on said rotated data units.

Typical checksum systems involve creating a single 'check value' using an exclusive OR (i.e., XOR) operation applied to each byte or word of the data to be protected. In one embodiment, the present invention provides an enhanced checksum system wherein the data is not directly exclusively ORed, rather the address of the byte, from the start of the data, is fed into a simple hash function. The hash function is employed to provide protection against cases where blocks of data are reordered.

The output of the hash function is used to rotate the bits of data from the input stream before they are fed into the XOR operation. As such, information into the XOR operation includes the bytes of data that are being fed to the XOR operation, modified by their relative address (i.e., the bytes of data that are being fed to the XOR operation, shifted by a function dependant on their address). Hence re-ordering of bytes of data can be detected, not just modifications to the bytes.

An enhanced checksum system according to an embodiment of the invention is computationally efficient for calculating a checksum, and does not require a large number of processor cycles. An enhanced checksum system, according to an embodiment of the invention, detects several types of corruption including bit and byte flipping (i.e., the reordering of bytes).

If a large piece of data is protected with such an enhanced checksum and then a smaller subset is changed, the overall checksum can be recalculated without actually retrieving the data not being changed from storage. Application of the hash function effectively protects against regular types of byte reordering (i.e., irrespective of the block size that is reordered).

Figure 1:
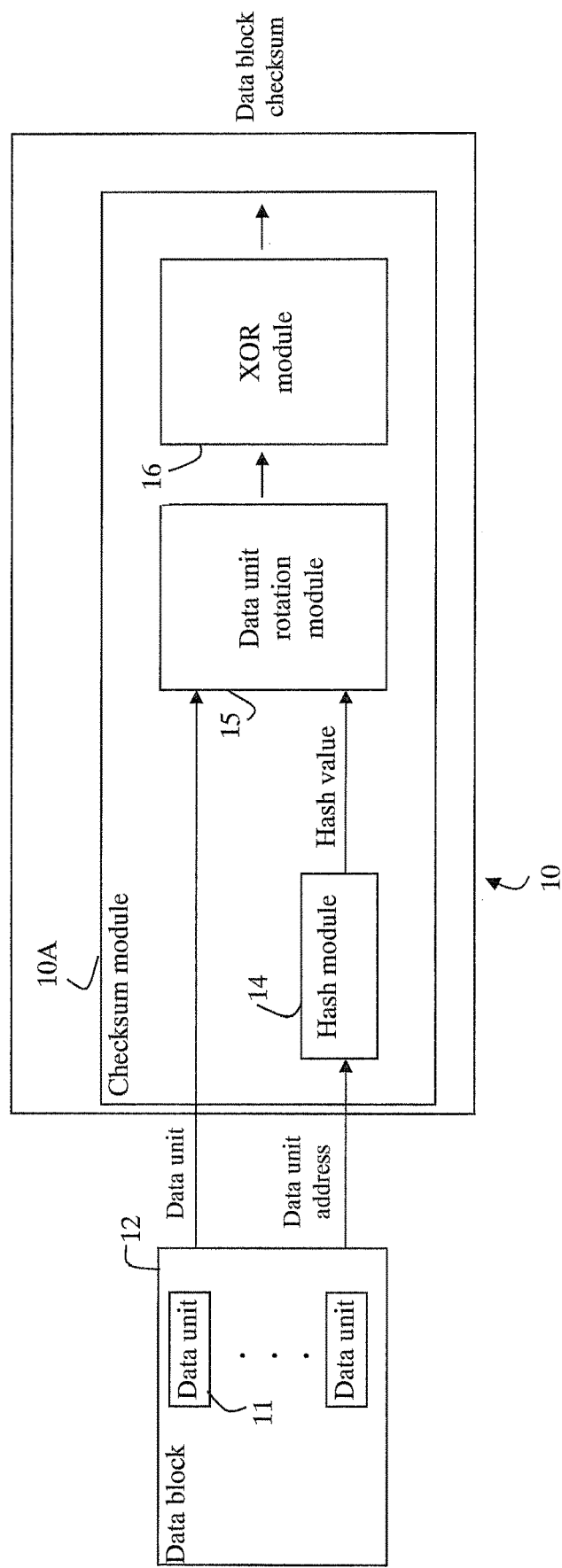
FIG. 1 is a block diagram of a system for computing a checksum for a data object, according to an embodiment of the invention.
Figure 2:
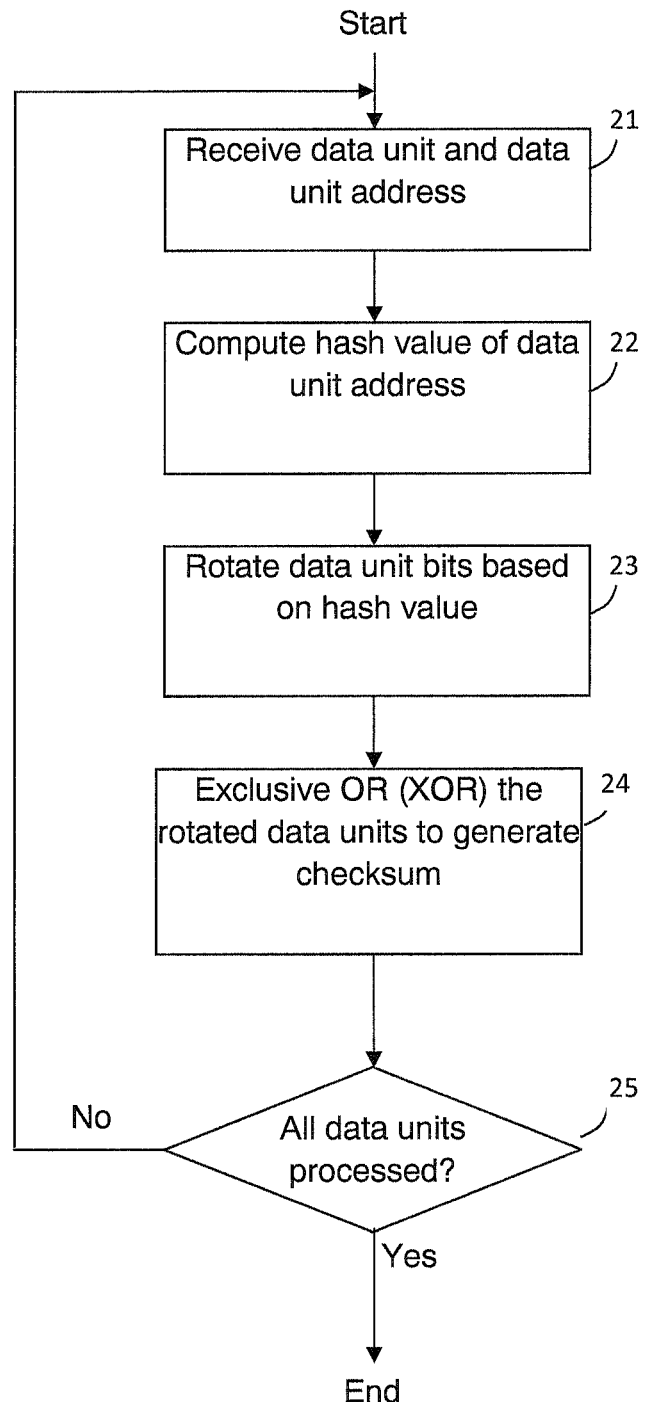
FIG. 2 is a flowchart of a process for computing a checksum for a data object, according to an embodiment of the invention.

An example implementation of a checksum system according to the present invention is described below. FIG. 1 shows a block diagram of a checksum system 10, according to an embodiment of the invention. The checksum system 10 implements a checksum computation process 20 as shown in FIG. 2, according to an embodiment of the invention.

According to process block 21, the check system 10 comprises a checksum module 10A that receives a data unit 11 such as a byte of data from a block of data 12 for which a checksum is being generated, and also receives the 'address' of that data unit. In one example, the address comprises the data unit offset from the start of the data block in a file, memory or storage in an information technology system.

The checksum module 10A comprises a hash module 14 that implements a hash function. According to process block 22, the hash function takes as an input the address of the data unit (e.g., offset from the start of a data object being protected), and generates a hash value therefrom in a range between 0 and the number of bits contained in each data unit.

In one example described herein, for a 32 bit checksum the hash value is between 0 and 31 and the hash function is a multiplication hash. The multiplication hash is a simple function using only a multiplication by a 'magic number' and a shift, as shown by an example hash function Hash( ) in Table 1 below, according to an embodiment of the invention. The 'magic number' is chosen to give a high quality hash that minimizes collisions.

TABLE 1

Hash function

```
unsigned int Hash(Value)
{
    return (Value * MAGIC_NUMBER >> 24);
}
```

The checksum module 10A further comprises a data unit rotation module 15. According to process block 23, the rotation module 15 uses the hash value to apply a mathematical rotation function to the data unit. Table 2 shows a example pseudo code implementation of the function of the module 10A as a ProcessByte( ) function which receives the data unit (i.e., Data) and data unit address (i.e., Address), and generates a hash value from the data unit address using the hash function. The hash value is used as a RotateLen value for rotating the data unit by the RotateLen value (e.g., bit shifting the data unit left or right in a register, wrapping bits that overflow from one end of the register into the opposite end, so no bits are lost), to generate a rotated data unit, according to an embodiment of the invention.

TABLE 2

Data unit processing

```
unsigned int ProcessByte(unsigned int Data, unsigned int Address)
{
    RotateLen = Hash(Address);
    Return (Data << RotateLen) | (Data >> (32- RotateLen))
}
```

The checksum system 10 further includes an XOR module 16. According to decision process block 24, the XOR module 16 in a computation process block to process each rotated data unit 11 of the data block 12 until all data units of data block 12 are processed, according to process block 25.

According to process block 24, the system 10 in a checksum computation process block of the module 16 utilizes an XOR on the rotated data units from Process-Byte( ) unction in order to generate a checksum for the data block.

Table 3 shows an example pseudo code implementation of said XOR computation process block of the module 16 as a ProcessBlock( ) function, according to an embodiment of the invention.

TABLE 3

Data block checksum processing

```
unsigned int ProcessBlock(unsigned int DataBlock[ ], unsigned int Len, unsigned
Offset=0)
{
    Unsigned int Checksum = 0;
    For (Address=0; Address<Len; Address++)
    {
        Checksum = Checksum ^ ProcessByte(DataBlock[Address],
        Address+Offset);
    }
    Return Checksum;
}
```

In one implementation of the ProcessBlock( ) function above, the Checksum field is initialized with a value other than zero to provide an extra form of signing of the checksum. The Offset value represents the data unit offset in the data block, and initially defaults to zero for computing a checksum of the entire data block.

Figure 3:
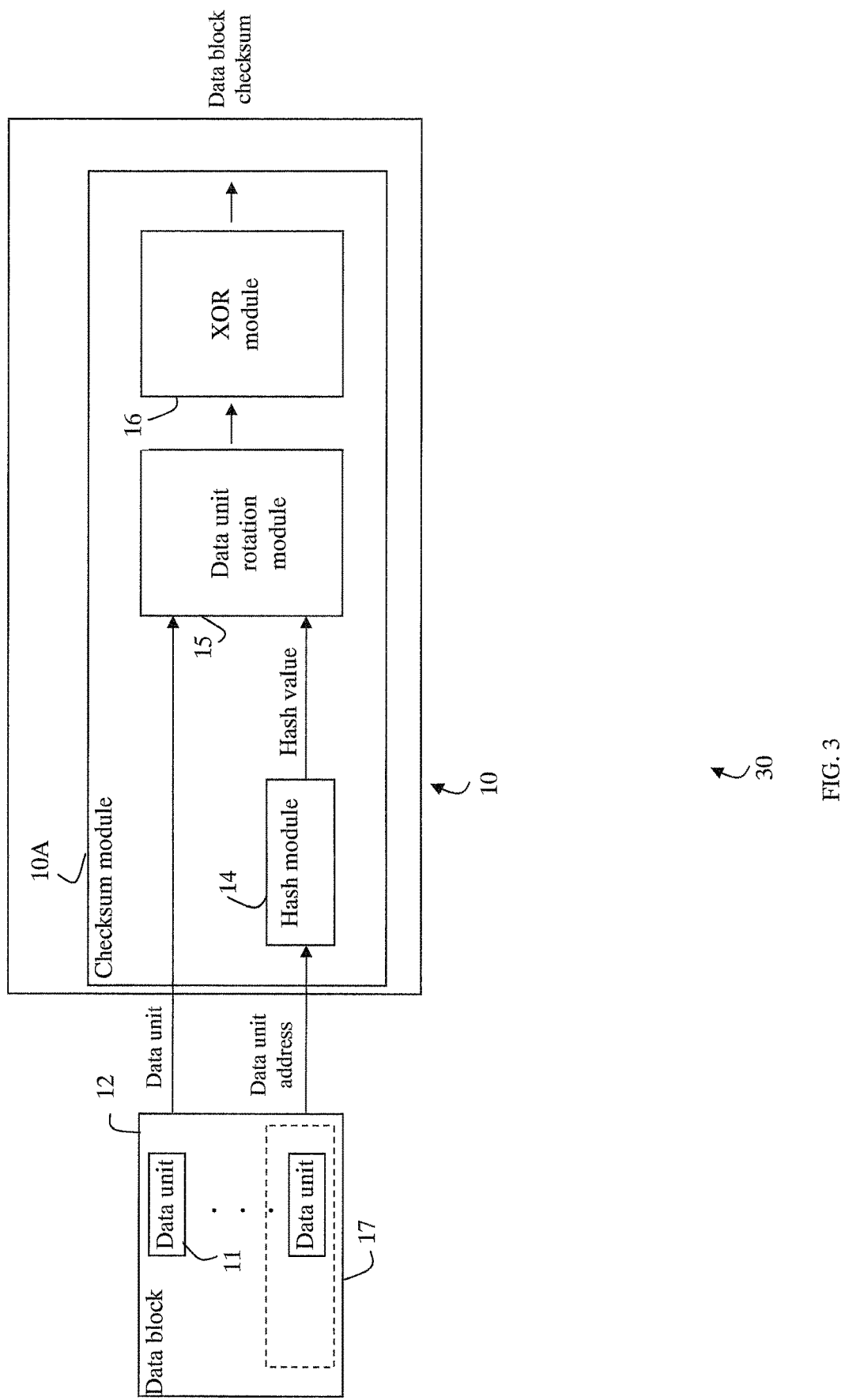
FIG. 3 is a block diagram of a system for re-computing a checksum for a data object, according to an embodiment of the invention.
Figure 4:
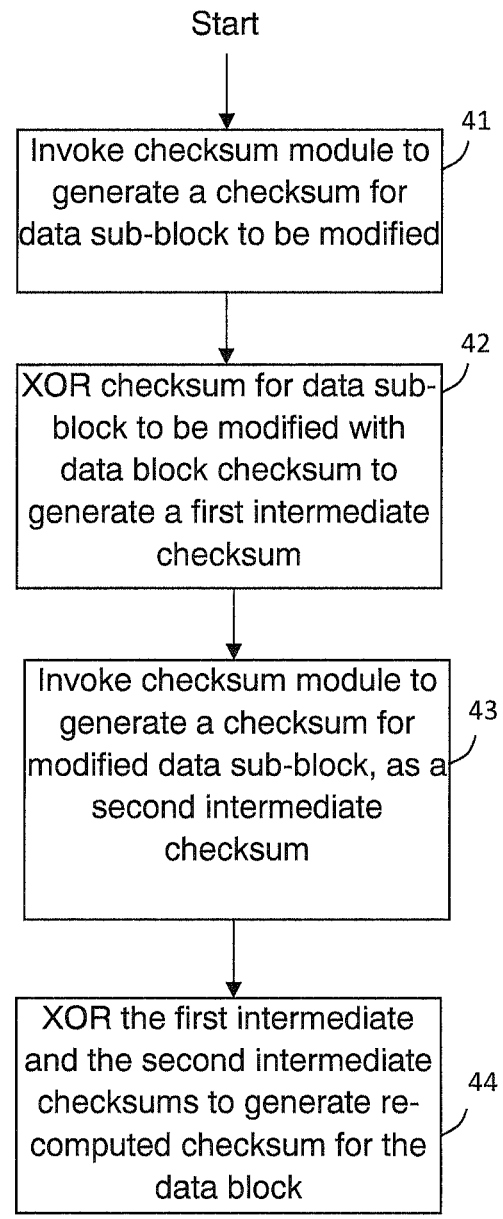
FIG. 4 is a flowchart of a process for re-computing a checksum for a data object, according to an embodiment of the invention.

Referring to FIG. 3, according to an embodiment of the invention, a checksum system 30 includes the components of the checksum system 10 wherein the module 16 further comprises a checksum re-computation process block 18. The checksum re-computation process block 18 implements a checksum re-computation process 40 as shown in FIG. 4, according to an embodiment of the invention.

When a checksum for the data block 12 is determined by checksum computation process block 16, and later a sub-block (i.e., segment) 17 of the data block 12 is to be modified such that the checksum requires modification, the process block 41 comprises invoking the ProcessBlock( ) function, to generate a checksum for the sub-block that will be modified. The ProcessBlock( ) function is provided only with the data that will be modified, wherein the Offset value is set to the offset from the start of the total data block to the start of the sub-block within the data block.

Process block 42 comprises performing exclusive OR the result of process block 41 with the current checksum for the entire data block (this effectively subtracts out the checksum for the sub-block) to generate a first intermediate checksum. Process block 43 comprises invoking the ProcessBlock( ) function for the new (i.e., modified) contents of the sub-block to generate a second intermediate checksum, wherein the Offset value is the same as in process block 41 as the offset of the sub-block form the start of the data block. Process block 44 comprises performing exclusive OR of the second intermediate checksum result of process block 43 into the first intermediate checksum from process block 42 to generate a re-computed checksum (this effectively adds in the checksum for the new sub-block).

A checksum process according to an embodiment of the present invention can be used to detect reordering types of corruption in addition to simple bit or byte errors.

A checksum process according to an embodiment of the invention can further be used to re-compute the checksum of a large data block when a subset changes without requiring access to the entire data block. In one implementation, the checksum process is useful with a file system or a storage system which maintains a checksum of the entire contents of a file.

Frequently only a small subset of the file will be modified or altered. With most conventional CRC algorithms, which would provide the same degree of protection from data reordering, the entire file would have to be re-read to compute the new protection information. However, according to embodiments of the invention the checksum process requires only the portion of the data being changed/replaced to be read to re-compute the checksum for the file. In addition the most common error in a file system, which manages a file as a sequence of blocks, is returning the wrong blocks or blocks out of order. A checksum process according to an embodiment of the invention provides protection from this type of error, whereas a simple XOR checksum does not.

Figure 5:
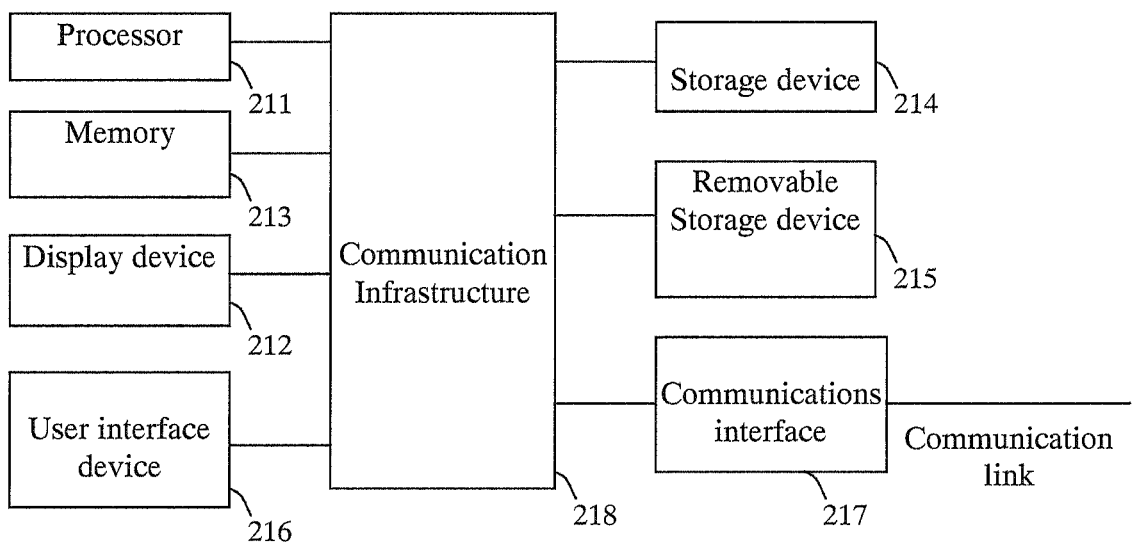
FIG. 5 is a high level block diagram showing an information processing system comprising a computer system useful for implementing an embodiment of the invention.

FIG. 5 is a high level block diagram showing an information processing system comprising a computer system 200 useful for implementing an embodiment of the present invention. The computer system 200 includes one or more processors 211, and can further include an electronic display device 212 (for displaying graphics, text, and other data), a main memory 213 (e.g., random access memory (RAM)), storage device 214 (e.g., hard disk drive), removable storage device 215 (e.g., removable storage drive, removable memory module, a magnetic tape drive, optical disk drive, computer readable medium having stored therein computer software and/or data), user interface device 216 (e.g., keyboard, touch screen, keypad, pointing device), and a communication interface 217 (e.g., modem, a network interface (such as an Ethernet card), a communications port, or a PCMCIA slot and card). The communication interface 217 allows software and data to be transferred between the computer system and external devices. The system 200 further includes a communications infrastructure 218 (e.g., a communications bus, cross-over bar, or network) to which the aforementioned devices/modules 211 through 217 are connected.

Information transferred via communications interface 217 may be in the form of signals such as electronic, electromagnetic, optical, or other signals capable of being received by communications interface 217, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. One embodiment comprises tangible storage medium readable by a computer system and storing instructions for execution by the computer system for performing a method according to embodiments of the invention. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of generating a checksum for a data object including a first data unit, the method comprising:
    obtaining a first corresponding address of the first data unit;
    rotating the first data unit based on said first corresponding address to generate a first rotated data unit;
    generating the checksum for the data object based on said first rotated data unit; and
    detecting corruption of the data object based on the checksum.

2. The method of claim 1, wherein the rotating of the first data unit comprises:
    generating a hash value from the corresponding first address of the first data unit using a hashing function; and
    rotating the first data unit by the hash value to generate said first rotated data unit.

3. The method of claim 2, wherein:
the hash value output is in a range between 0 and a bit size of said first data unit.

4. The method of claim 2, wherein:
the generating of the checksum for the data object comprises generating an exclusive OR of the first rotated data unit and a second rotated data unit, the second rotated data unit being generated from a second data unit included in the data object.

5. The method of claim 2, wherein:
the address of the first data unit comprises a relative offset of the first data unit within the data object.

6. The method of claim 2, further comprising recomputing a checksum for the data object, said re-computing comprising:
generating a checksum for a data segment of the data object;
effectively subtracting the checksum of said data segment from the checksum of the data object to generate a first intermediate checksum;
modifying said data segment to generate a modified data segment;
generating a checksum for said modified data segment to generate a second intermediate checksum; and
adding the first and the second intermediate checksums to generate a re-computed checksum for the data object.

7. The method of claim 6, wherein:
the effectively subtracting of the checksum of said data segment from the checksum of the data object to generate the first intermediate checksum comprises performing an exclusive OR of the checksum of said data segment from the checksum of the data object to generate the first intermediate checksum; and
the adding of the first and the second intermediate checksums to generate the recomputed checksum for the data object comprises performing an exclusive OR of the first and the second intermediate checksums to generate the re-computed checksum for the data object.

8. A system for generating a checksum for a data object including a first data unit, the system comprising:
a rotation module that rotates the first data unit based on a corresponding first address of the first data unit to generate a first rotated data unit;
a checksum module that generates the checksum for the data object based on said first rotated data unit; and
detecting corruption of the data object based on the checksum.

9. The system of claim 8, wherein the rotation module rotates the first data unit by:
utilizing a hash module to generate a hash value from the first corresponding address of the first data unit using a hashing function; and
rotating the first data unit by the hash value to generate said first rotated data unit.

10. The system of claim 9, wherein:
the hash value output is in a range between 0 and a bit size of said first data unit.

11. The system of claim 9, wherein:
the checksum module generates the checksum for the data object by generating an exclusive OR of the first rotated data unit and a second rotated data unit, the second rotated data unit being generated from a second data unit included in the data object.

12. The system of claim 9, wherein:
the address of the first data unit comprises a relative offset of the first data unit within the data object.

13. The system of claim 9, wherein the checksum module recomputes a checksum for the data object by:
generating a checksum for a data segment of the data object;
effectively subtracting the checksum of said data segment from the checksum of the data object to generate a first intermediate checksum;
modifying said data segment to generate a modified data segment;
generating a checksum for said modified data segment to generate a second intermediate checksum;
adding the first and the second intermediate checksums to generate a re-computed checksum for the data object; and
detecting corruption of the data object based on the checksum.

14. The system of claim 13, wherein the checksum module:
effectively subtracts the checksum of said data segment from the checksum of the data object to generate the first intermediate checksum by performing an exclusive OR of the checksum of said data segment from the checksum of the data object to generate the first intermediate checksum; and
adds the first and the second intermediate checksums to generate the re-computed checksum for the data object by performing an exclusive OR of the first and the second intermediate checksums to generate the re-computed checksum value for the data object.

15. A computer program product for generating a checksum for a data object including a first data unit, the computer program product comprising:
a non-transitory tangible storage medium readable by a computer system and storing instructions for execution by the computer system for performing a method comprising:
obtaining a first corresponding address of the first data unit;
rotating the first data unit based on said first corresponding address to generate a first rotated data unit;
generating the checksum for the data object based on said first rotated data unit; and
detecting corruption of the data object based on the checksum.

16. The computer program product of claim 15,
wherein the instructions stored by the non-transitory tangible storage medium are for performing the method further comprising:
generating a hash value from the first corresponding address of the first data unit using a hashing function; and
rotating the first data unit by the hash value to generate a first rotated data unit.

17. The computer program product of claim 16, wherein:
the hash value output is in a range between 0 and a bit size of said data unit.

18. The computer program product of claim 16, wherein:
the generating the checksum for the data object comprises generating an exclusive OR of the first rotated data unit and a second rotated data unit, the second rotated data unit being generated from a second data unit included in the data object.

19. The computer program product of claim 16, wherein:

the address of the first data unit comprises a relative offset of the first data unit within the data object.

20. The computer program product of claim 16, wherein the instructions stored by the non-transitory tangible storage medium are for performing the method further comprising re-computing a checksum value for the data object when a data segment of the data object is to be modified, said re-computing comprising:

generating a checksum for a data segment of the data object;

effectively subtracting the checksum of said data segment from the checksum of the data object to generate a first intermediate checksum;

modifying said data segment to generate a modified data segment;

generating a checksum for said modified data segment to generate a second intermediate checksum;

adding the first and the second intermediate checksums to generate a re-computed checksum value for the data object; and detecting corruption of the data object based on the re-computed checksum.

21. The computer program product of claim 20, wherein:

the effectively subtracting the checksum of said data segment from the checksum of the data object to generate the first intermediate checksum comprises performing an exclusive OR of the checksum of said data segment from the checksum of the data object to generate the first intermediate checksum; and adding the first and the second intermediate checksums to generate the re-computed checksum for the data object comprises performing an exclusive OR of the first and the second intermediate checksums to generate the re-computed checksum for the data object.

\* \* \* \* \*